US012656628B2

(12) United States Patent
Chen

(10) Patent No.: US 12,656,628 B2
(45) Date of Patent: Jun. 16, 2026

(54) VENTILATION AND LENS REPLACEMENT ASSEMBLY FOR SNOW GOGGLES

(71) Applicant: PROHERO GROUP CO., LTD., Tainan City (TW)

(72) Inventor: Pen-Wei Chen, Tainan City (TW)

(73) Assignee: Prohero Group Co., Ltd., Tainan City (TW)

( * ) Notice: Subject to any disclaimer, the term of this patent is extended or adjusted under 35 U.S.C. 154(b) by 299 days.

(21) Appl. No.: 18/541,573

(22) Filed: Dec. 15, 2023

(65) Prior Publication Data

US 2025/0199330 A1     Jun. 19, 2025

(51) Int. Cl.
*G02C 3/00*        (2006.01)
*G02C 11/08*       (2006.01)
(52) U.S. Cl.
CPC ............. *G02C 3/003* (2013.01); *G02C 11/08* (2013.01)
(58) Field of Classification Search
CPC .... G02C 3/003; G02C 11/08; G02C 2200/04; G02C 2200/08; G02C 2200/26; G02C 1/10
USPC ......................................................... 351/156
See application file for complete search history.

(56) References Cited

U.S. PATENT DOCUMENTS

| | | | | |
|---|---|---|---|---|
| 2006/0156457 A1* | 7/2006 | Penque, Jr. | ............. | A61F 9/028 |
| | | | | 2/431 |
| 2007/0234526 A1* | 10/2007 | Chen | .................... | A63B 33/002 |
| | | | | 24/265 R |
| 2012/0038879 A1* | 2/2012 | Reyes | ...................... | G02C 1/04 |
| | | | | 351/107 |
| 2015/0049294 A1* | 2/2015 | Chin | ........................ | G02C 5/08 |
| | | | | 351/86 |
| 2015/0124211 A1* | 5/2015 | Park | ........................ | G02C 9/04 |
| | | | | 351/47 |
| 2016/0085091 A1* | 3/2016 | Chu | ........................ | G02C 1/02 |
| | | | | 351/62 |
| 2017/0100287 A1* | 4/2017 | Calilung | ................. | A61F 9/025 |
| 2017/0128267 A1* | 5/2017 | Rees | ......................... | A61F 9/02 |
| 2019/0038466 A1* | 2/2019 | Frensley | ................. | A61F 9/025 |
| 2019/0388276 A1* | 12/2019 | Li | ............................ | A61F 9/028 |
| 2020/0113738 A1* | 4/2020 | Calilung | ................. | A61F 9/029 |
| 2021/0196522 A1* | 7/2021 | Sison | ...................... | A61F 9/025 |
| 2022/0040002 A1* | 2/2022 | Møller | .................... | A61F 9/025 |
| 2022/0110794 A1* | 4/2022 | Frensley | ................. | A61F 9/025 |

* cited by examiner

*Primary Examiner* — William R Alexander
(74) *Attorney, Agent, or Firm* — Rosenberg, Klein & Lee

(57)        ABSTRACT
A ventilation and lens replacement assembly for snow goggles is provided. Two positioning members are correspondingly connected with two sides of a frame. Insertion portions on two sides of a lens are inserted into the positioning members. The above design not only makes assembling of the lens easier and more convenient, but also provides two-stage pressing for quick release and easy replacement of the lens as well as having a gap formed between the lens and the frame for ventilation.

8 Claims, 8 Drawing Sheets

VENTILATION AND LENS REPLACEMENT ASSEMBLY FOR SNOW GOGGLES

BACKGROUND OF THE INVENTION

Field of the Invention

The present invention relates to a ventilation and lens replacement assembly, especially to a ventilation and lens replacement assembly for snow goggles which not only makes assembling of a lens easier and more convenient, but also provides two-stage pressing for quick release and easy replacement of the lens as well as having a gap left between the lens and a frame for ventilation.

Description of Related Art

In structural design, snow goggles include a frame provided with a penetrating lens assembly hole in a front surface of the frame. A lens mounting groove is formed on a periphery of the lens assembly hole for mounting the lens in the lens assembly hole and a periphery of the lens is fixed and connected with the lens mounting groove. Thus the frame of the goggles is attached closely to area around user's eyes on the face for shielding the eyes by the lens in the lens assembly hole while the user wearing the goggles. Thereby users can see the surroundings clearly under protection of the goggles.

However, the periphery of the lens needs to be fixed and connected with the lens mounting groove on the periphery of the lens assembly hole after the lens being mounted in the lens assembly hole. The assembly of the lens is not convenient. Once the lens needs to be replaced, users should pull two sides of the frame with efforts in order to release the lens from the lens mounting groove. Sometimes users even need to use other tools for detachment of the lens. The above process is labor and time consuming. The assembly of a new lens is also quite inconvenient.

SUMMARY OF THE INVENTION

Therefore, it is a primary object of the present invention to provide a ventilation and lens replacement assembly for snow goggles, which not only makes assembling of a lens easier and more convenient, but also provides two-stage pressing for quick release and easy replacement of the lens as well as having a gap formed between the lens and a frame for ventilation.

In order to achieve the above object, a ventilation and lens replacement assembly for snow goggles according to the present invention mainly includes a frame, two positioning members, and a lens.

The frame is composed of a penetrating lens mounting hole formed on a front surface of the frame, two corresponding mounting grooves disposed on the frame and corresponding to two sides of the lens mounting hole, and an assembly portion projecting from a middle part of the mounting groove toward an outer side of the frame. The assembly portion is provided with two insertion holes corresponding to each other and communicating with the mounting groove and a projecting elastic support member is formed between the two insertion holes.

The positioning member consists of a positioning seat, a connection base, a moveable pushing block, elastic members, and a pressing control member. The positioning seat is corresponding to the mounting groove of the frame for being mounted in and connected with the mounting groove. The positioning seat consists of two penetrating holes corresponding to the insertion holes of the assembly portion, and a first positioning portion and a second positioning portion both located between the two penetrating holes and respectively disposed on an inner surface of the positioning seat at an inner side and an outer side. The connection base is correspondingly fixed and connected with the positioning seat. One side of the connection base corresponding to the positioning seat is provided with a recessed portion while two corresponding guiding grooves are correspondingly arranged at an upper part and a lower part of the recessed portion. The moveable pushing block is mounted in the recessed portion. Two limit protrusions are correspondingly disposed on an upper end and a lower end of the moveable pushing block and corresponding to the guiding grooves for being mounted in the guiding grooves. Thus the moveable pushing block can be limited and moved inward and outward within the guiding grooves. The elastic members are disposed between an inner surface of the recessed portion and the moveable pushing block. The pressing control member includes a first abutting portion and a second abutting portion respectively arranged at an inner side and an outer side and corresponding to the first positioning portion and the second positioning portion. After the first abutting portion and the second abutting portion being inserted through the insertion holes of the assembly portion, the elastic support member of the assembly portion is abutting against an inner surface of the pressing control member.

The lens is provided with an insertion portion arranged at each of two sides. The insertion portion is inserted into a space between the positioning seat and the connection base of the positioning member and pushing the moveable pushing block to move inward. A positioning part is disposed on a middle part of the insertion portion and moveable to be positioned and connected with the first positioning portion or the second positioning portion.

DETAILED DESCRIPTION OF THE PREFERRED EMBODIMENT

Figure 1:
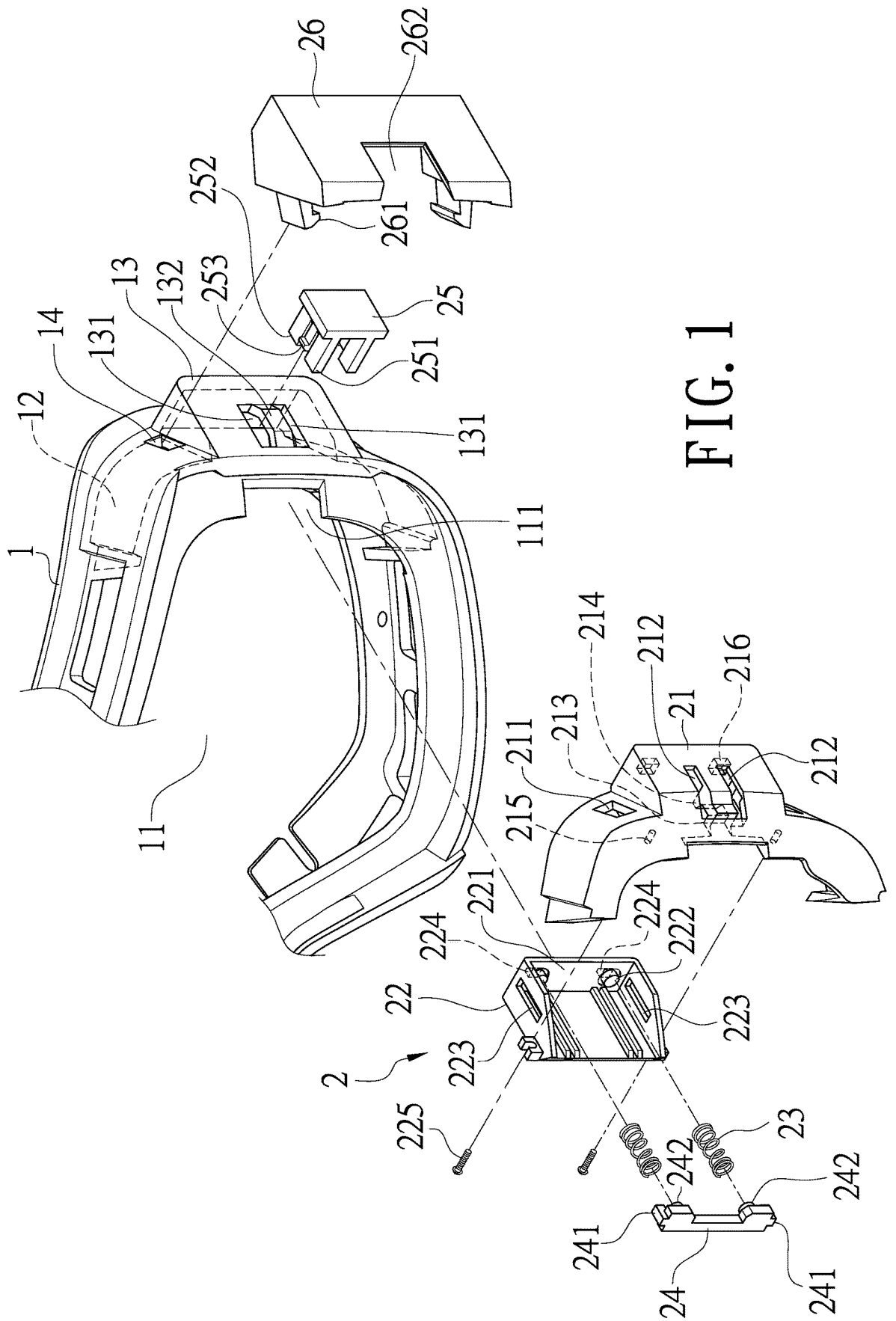
FIG. 1 is an exploded view of an embodiment according to the present invention.
Figure 2:
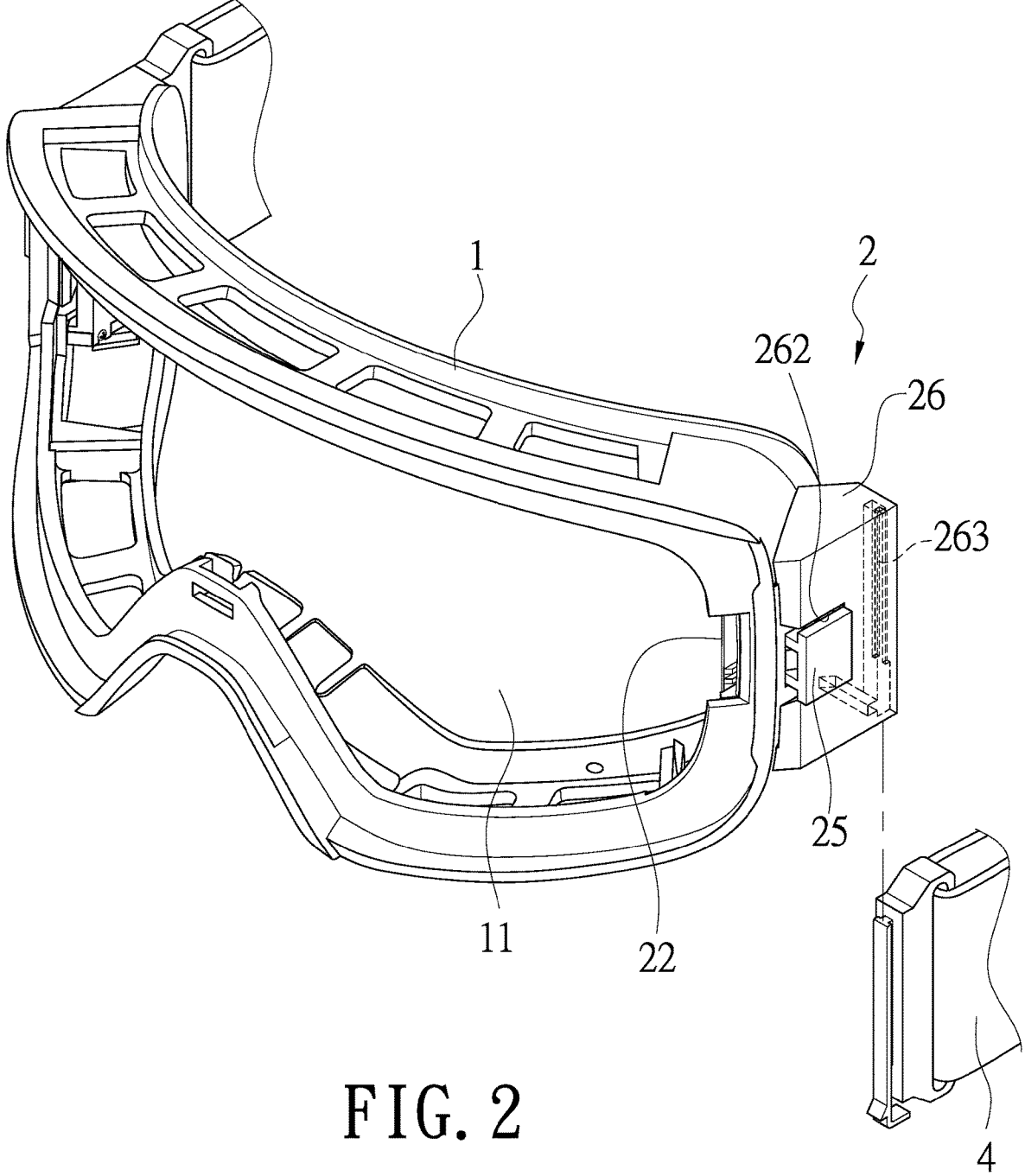
FIG. 2 is an exploded view of an embodiment showing assembly of a strap according to the present invention.
Figure 3:
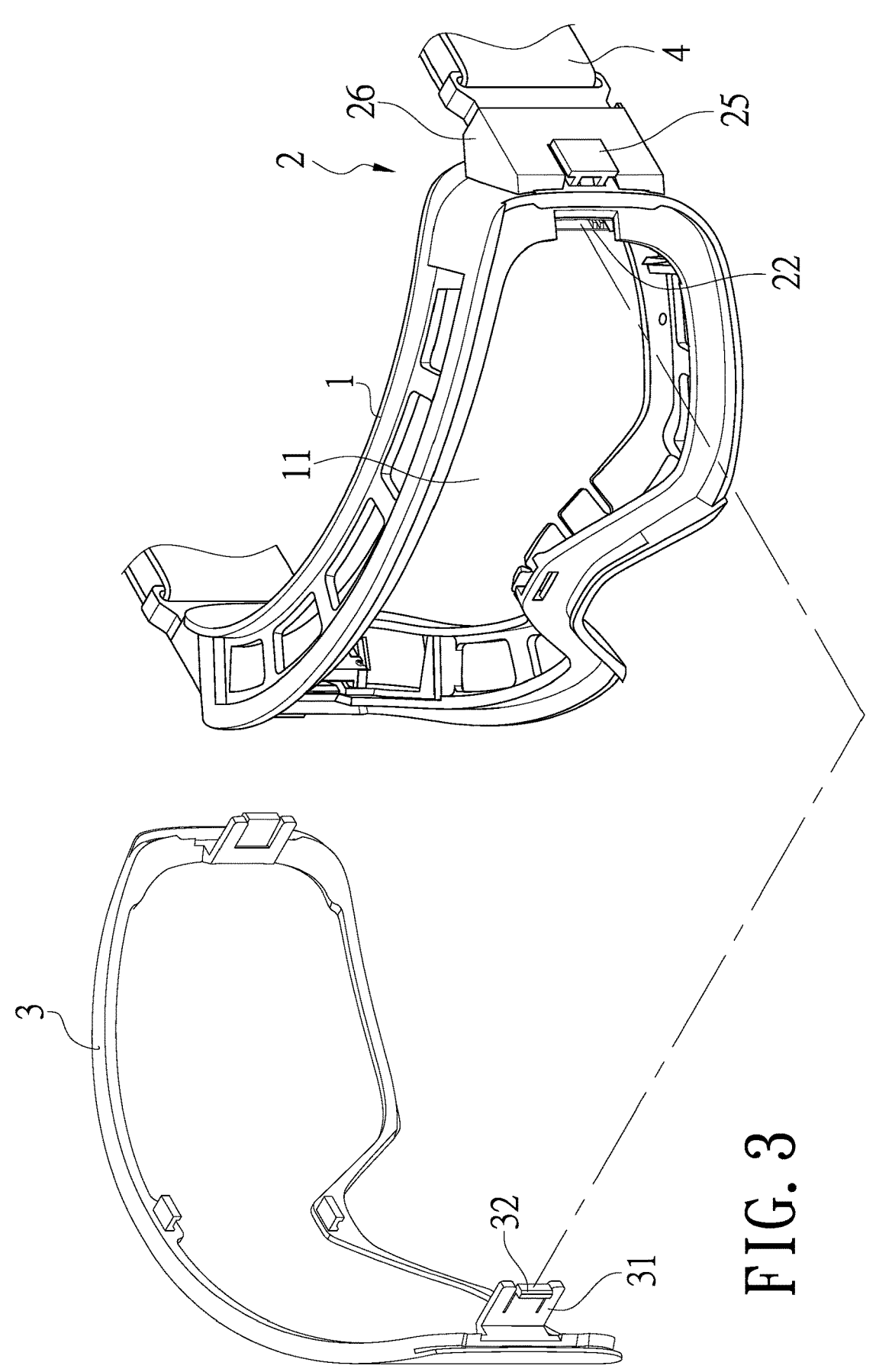
FIG. 3 is an exploded view of an embodiment showing assembly of a lens according to the present invention.
Figure 4:
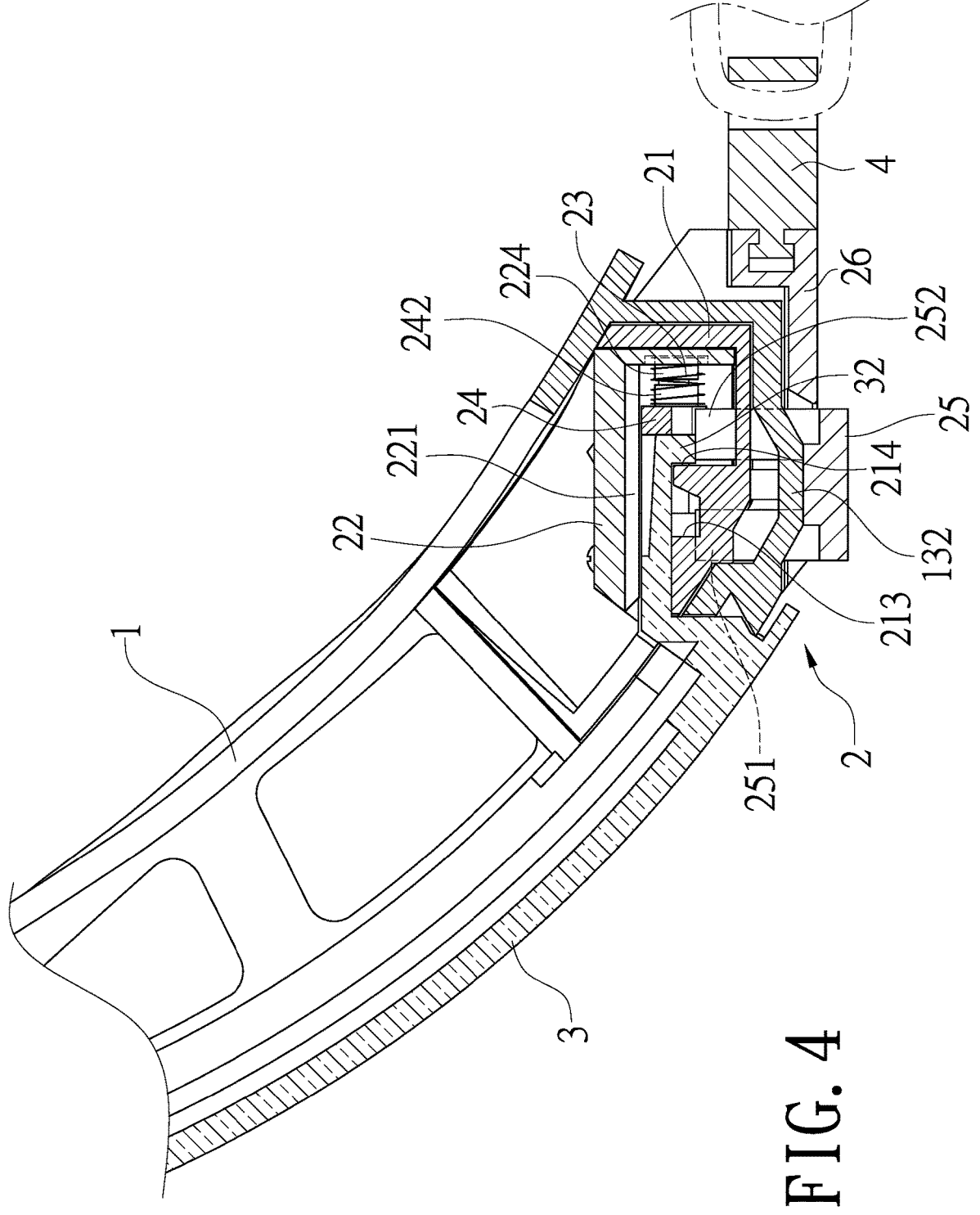
FIG. 4 is a top view of a section of an embodiment according to the present invention.

In order to learn technical content, features, and functions of the present invention more clearly and completely, please refer to the following embodiments with related figures and reference signs.

Refer to FIG. 1, FIG. 2, FIG. 3, and FIG. 4, exploded views and a top view of a section of an embodiment according to the present invention are provided. A ventilation and lens replacement assembly for snow goggles according to the present invention mainly includes a frame 1, two positioning members 2, and a lens 3.

The frame 1 consists of a lens mounting hole 11 penetrating and formed on a front surface of the frame 1, two corresponding mounting grooves 12 arranged at the frame 1 and corresponding to two sides of the lens mounting hole 11, an assembly portion 13 projecting from a middle part of the mounting groove 12 toward an outer side of the frame 1, a penetrating assembly through hole 14 located at each of two lateral sides of the frame 1 and corresponding to an upper end and a lower end of the assembly portion 13. The assembly portion 13 is provided with two insertion holes 131 corresponding to each other and communicating with the mounting groove 12, and a projecting elastic support member 132 formed between the two insertion holes 131. Each of the two sides of the lens mounting hole 11 corresponding to the assembly portion 13 is provided with a connecting recess 111.

The positioning member 2 is composed of a positioning seat 21 corresponding to the mounting groove 12 of the frame 1 for being mounted and connected with the mounting groove 12, a connection base 22 corresponding to the positioning seat 21, at least two elastic members 23, a moveable pushing block 24, a pressing control member 25, and an outer cover 26 correspondingly disposed on the assembly portion 13. The positioning seat 21 is provided with an assembly hole 211 corresponding to the assembly through hole 14, two penetrating holes 212 corresponding to the insertion holes 131 of the assembly portion 13, a first positioning portion 213 and a second positioning portion 214 both located between the two penetrating holes 212 and respectively disposed on an inner surface of the positioning seat 21 at an inner side and an outer side, at least one fastening hole 215 mounted to an inner side of the positioning seat 21, and at least one mounting hole 216 formed on an inner surface of the positioning seat 21. The connection base 22 includes a recessed portion 221 formed on one side thereof corresponding to the positioning seat 21, at least two first fitting protrusions 222 arranged at an inner surface of the recessed portion 221, two guiding grooves 223 disposed on an upper part and a lower part of the recessed portion 221 and corresponding to each other, and at least one mounting pins 224 projecting from the connection base 22 and able to be mounted and connected with the mounting hole 216 of the positioning seat 21. The connection base 22 is connected with the positioning seat 21 by fasteners 225 threaded and connected with the fastening holes 215. The first fitting protrusion 222 is mounted and connected with one end of the elastic member 23 while the moveable pushing block 24 is mounted in the recessed portion 221. Two limit protrusions 241 are correspondingly disposed on an upper end and a lower end of the moveable pushing block 24 and corresponding to the guiding grooves 223 for being mounted in the guiding grooves 223. Thus the moveable pushing block 24 can be limited and moved inward and outward within the guiding grooves 223. The moveable pushing block 24 is provided with at least two second fitting protrusions 242 each of which is mounted and connected with the other end of the elastic members 23. The pressing control member 25 includes a first abutting portion 251 and a second abutting portion 252 respectively arranged at an inner side and an outer side and corresponding to the first positioning portion 213 and the second positioning portion 214, and a locking protrusion 253 disposed between the first abutting portion 251 and the second abutting portion 252. After the first abutting portion 251, the second abutting portion 252, and the locking protrusion 253 being inserted through the insertion holes 131 of the assembly portion 13, the locking protrusion 253 is locked and connected with an inner side of the penetrating hole 212. Now the elastic support member 132 of the assembly portion 13 is abutting against an inner surface of the pressing control member 25. A locking protruding portion 261 is arranged at an upper end and a lower end of the outer cover 26. After being inserted through the assembly through hole 14, the locking protruding portion 261 is locked and positioned at an inner side of the assembly hole 211 of the positioning seat 21. A concave portion 262 is formed on the outer cover 26 at a position corresponding to the pressing control member 25 for allowing the pressing control member 25 to be pressed. In addition, an assembly groove 263 is mounted on a rear end of the outer cover 26 for mounting and connecting a strap 4.

The lens 3 is provided with an insertion portion 31 on each of two sides and a positioning part 32 disposed on a middle part of the insertion portion 31. The insertion portion 31 is inserted through the connecting recess 111 of the frame 1 into a space between the positioning seat 21 and the connection base 22 of the positioning member 2 and pushing the moveable pushing block 24 to move inward. The positioning part 32 is moveable to be positioned and connected with the first positioning portion 213 or the second positioning portion 214.

While in use, the insertion portion 31 on each of the two sides of the lens 3 are inserted through the connecting recess 111 of the frame 1 into the space between the positioning seat 21 and the connection base 22 of the positioning member 2. Then the insertion portion 31 is pushing the moveable pushing block 24 inward and the elastic members 23 are compressed by the moveable pushing block 24. When the insertion portion 31 is pushed inward completely, the positioning part 32 is moved to be fixed and connected with the second positioning portion 214. Thereby the lens 3 is precisely assembled and positioned in the lens mounting hole 11 of the frame 1.

Figure 5:
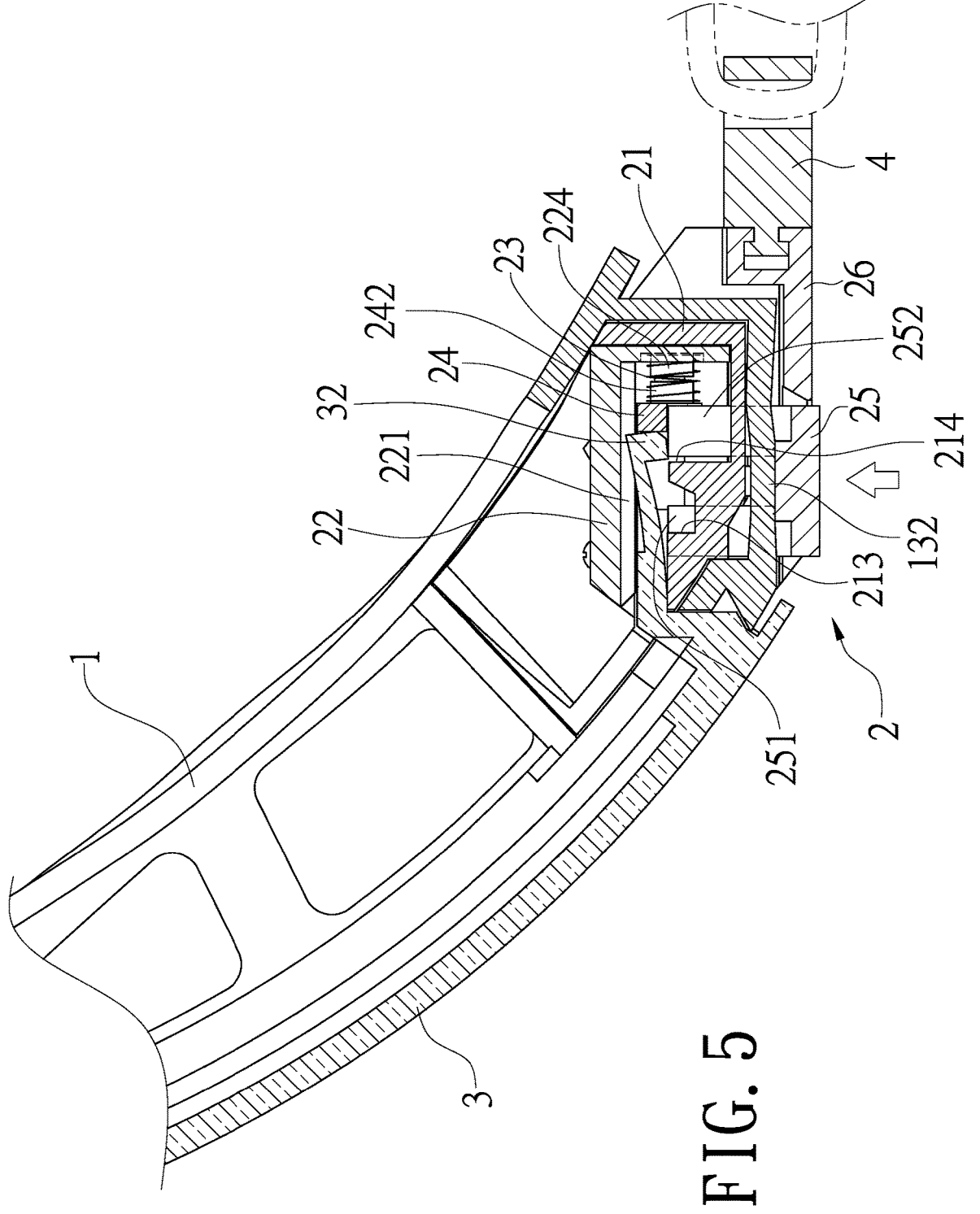
FIG. 5 is a top view of a section showing action of an embodiment in a first use state according to the present invention.
Figure 6:
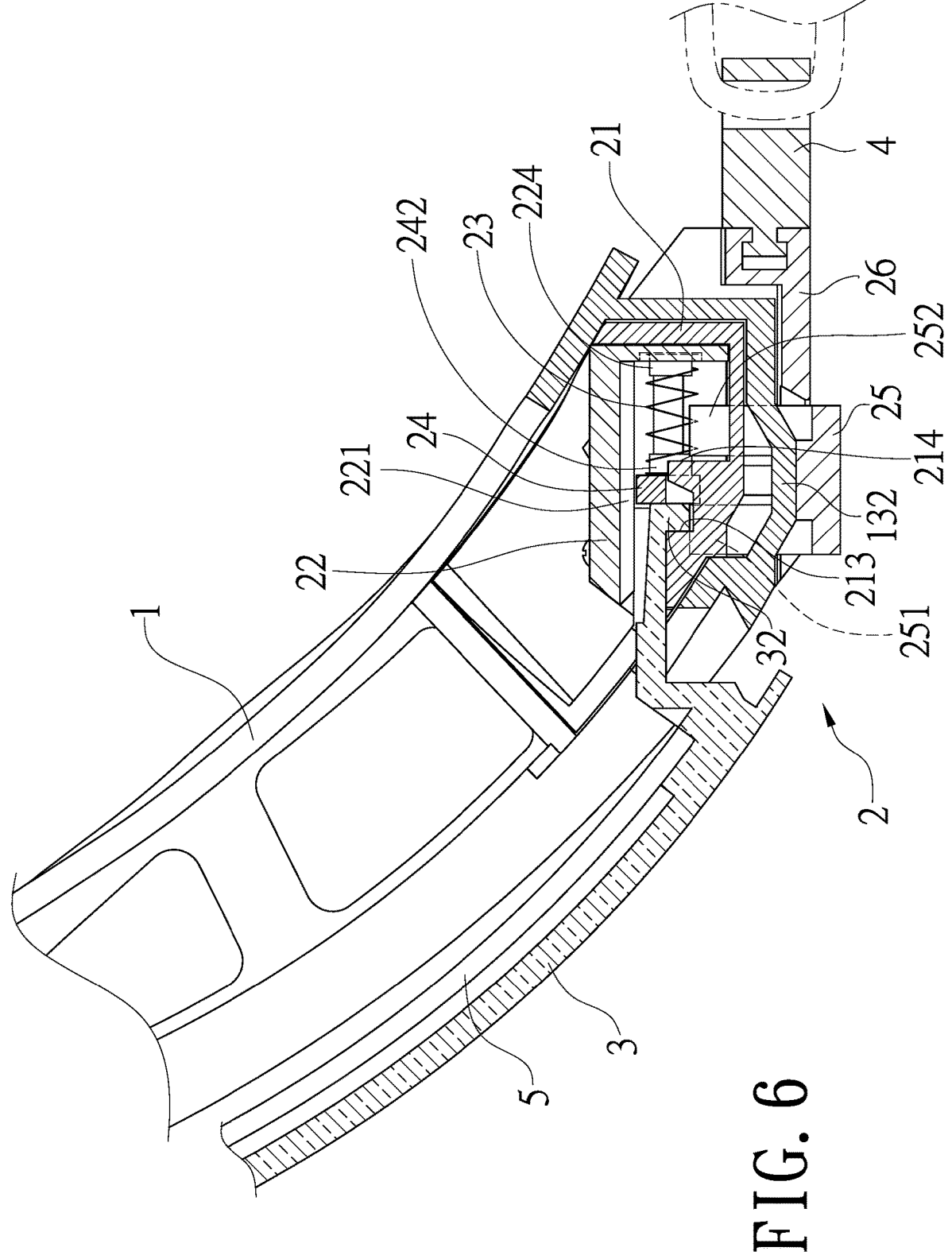
FIG. 6 is a top view of a section of an embodiment in a first use state according to the present invention.

Refer to FIG. 5, a top view of a section of an embodiment in a first use state is provided. When the pressing control member 25 is pressed inward, the second abutting portion 252 abuts against and pushes the positioning part 32 located on the second positioning portion 214 outward so that the positioning part 32 is released from the second positioning portion 214. At the moment, the moveable pushing block 24 is pushed outward due to elasticity of the elastic members 23 and further abutting against and pushing the insertion portion 31 to move outward. Thereby the lens 3 is released from tight connection with the lens mounting hole 11. And an inner surface of the pressing control member 25 is pushed outward by the elastic support member 132 of the assembly portion 13 and returned to original position while the positioning part 32 is moved to the first positioning portion 213 to be fixed and connected with the first positioning portion 213. There is a gap 5 formed between the lens 3 and the lens mounting hole 11 for ventilation, as shown in FIG. 6.

Figure 7:
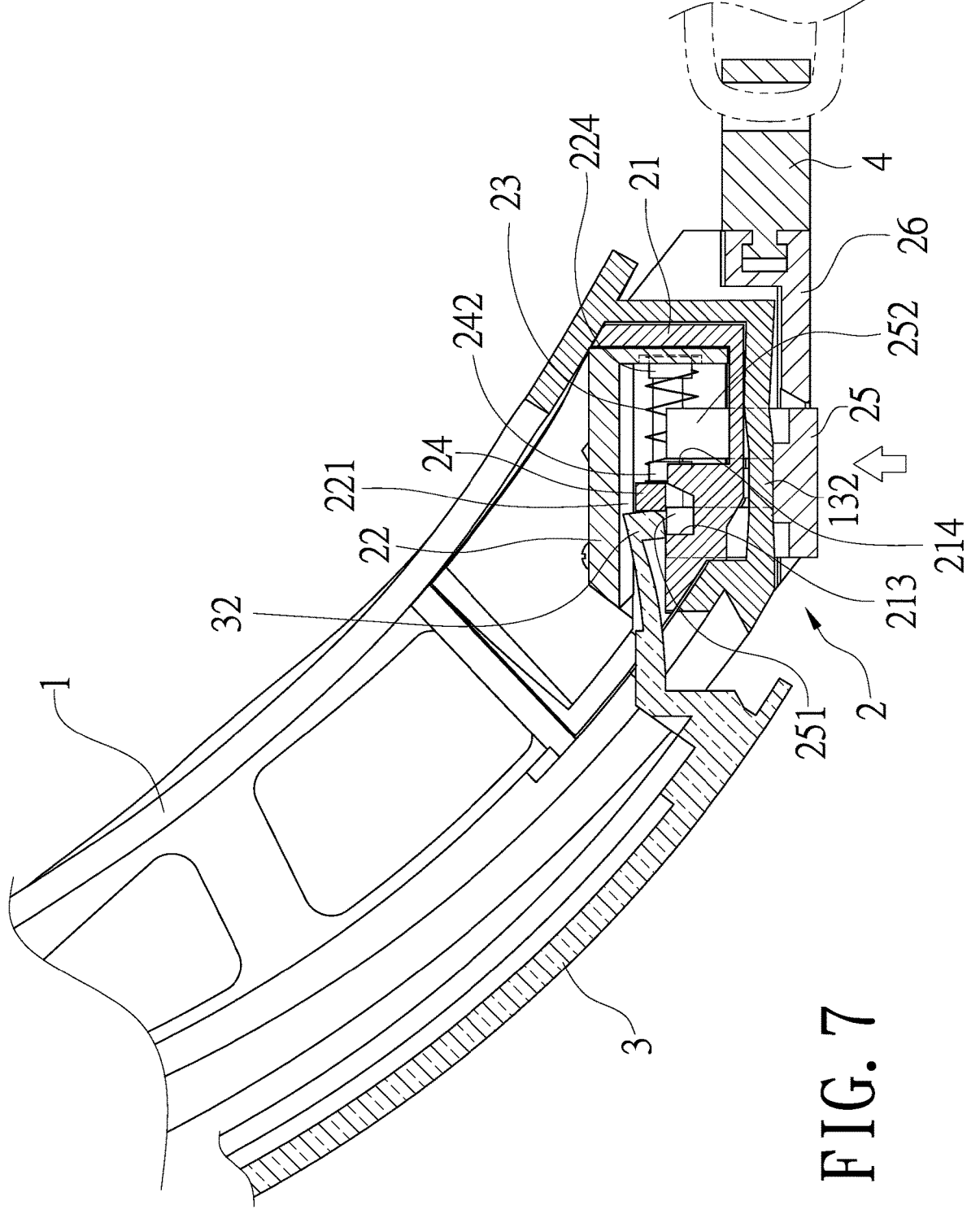
FIG. 7 is a top view of a section showing action of an embodiment in a second use state according to the present invention.
Figure 8:
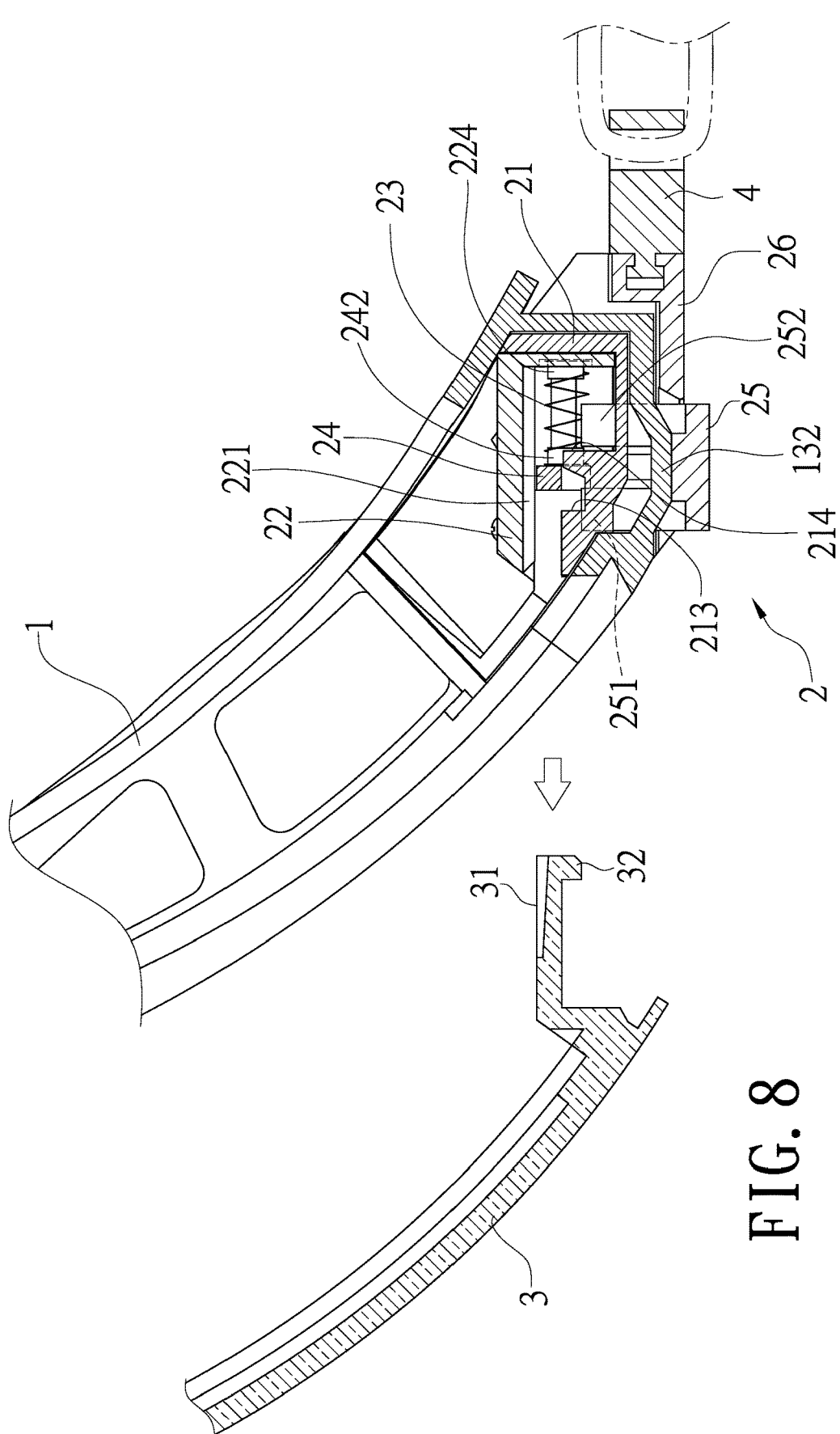
FIG. 8 is a top view of a section of an embodiment in a second use state according to the present invention.

Also refer to FIG. 7, a top view of a section of an embodiment in a second use state is provided. While pressing the pressing control member 25 inward again, the first abutting portion 251 abuts against and pushes the positioning part 32 located on the first positioning portion 213 to move outward. Thus the positioning part 32 is released from the first positioning portion 213. At the moment, the moveable pushing block 24 is pushed outward due to elasticity of the elastic members 23 and further abutting against and pushing the insertion portion 31 to move outward. Thereby the lens 3 is completely separated from the lens mounting hole 11, as shown in FIG. 8. The surface of the inner side of the pressing control member 25 is pushed outward by the elastic support member 132 of the assembly portion 13 and returned to the original position. Therefore, users can replace the lens 3 now.

In summary, compared with techniques available now, the present invention not only makes assembling of the lens easier and more convenient, but also provides two-stage pressing for quick release and easy replacement of the lens as well as having the gap left between the lens and the frame for ventilation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A ventilation and lens replacement assembly for snow goggles comprising
a frame, two positioning members, and a lens;
wherein the frame includes a penetrating lens mounting hole formed on a front surface of the frame, two corresponding mounting grooves disposed on the frame and corresponding to two sides of the lens mounting hole, and an assembly portion projecting from a middle part of the mounting groove toward an outer side of the frame; the assembly portion includes two corresponding insertion holes communicating with the mounting groove, and a projecting elastic support member formed between the two insertion holes;
wherein the positioning member includes a positioning seat, a connection base, a moveable pushing block, at least two elastic members, and a pressing control member; the positioning seat is corresponding to the mounting groove of the frame for being mounted in and connected with the mounting groove; the positioning seat consists of two penetrating holes corresponding to the insertion holes of the assembly portion, and a first positioning portion and a second positioning portion both located between the two penetrating holes and respectively disposed on an inner surface of the positioning seat at an inner side and an outer side; the connection base is correspondingly fixed and connected with the positioning seat; one side of the connection base corresponding to the positioning seat is provided with a recessed portion while two corresponding guiding grooves are correspondingly arranged at an upper part and a lower part of the recessed portion; the moveable pushing block is mounted in the recessed portion; two limit protrusions are correspondingly disposed on an upper end and a lower end of the moveable pushing block and corresponding to the guiding grooves for being mounted in the guiding grooves so that the moveable pushing block is able to be limited and moved inward and outward within the guiding grooves; the elastic members are disposed between an inner surface of the recessed portion and the moveable pushing block; the pressing control member includes a first abutting portion and a second abutting portion respectively arranged at an inner side and an outer side thereof and corresponding to the first positioning portion and the second positioning portion; the elastic support member of the assembly portion is abutting against an inner surface of the pressing control member after the first abutting portion and the second abutting portion being inserted through the insertion holes of the assembly portion;
wherein the lens is provided with an insertion portion arranged at each of two sides and a positioning part disposed on a middle part of the insertion portion; the insertion portion is inserted into a space between the positioning seat and the connection base of the positioning member and pushing the moveable pushing block to move inward; the positioning part is moveable to be positioned and connected with the first positioning portion or the second positioning portion.

2. The ventilation and lens replacement assembly for snow goggles as claimed in claim 1, wherein a penetrating assembly through hole is located at each of two lateral sides of the frame and corresponding to an upper end and a lower end of the assembly portion; the positioning seat is provided with an assembly hole corresponding to the assembly through hole; an outer cover is correspondingly disposed on the assembly portion and provided with a locking protruding portion arranged at both an upper end and a lower end thereof; the locking protruding portion is locked and positioned at an inner side of the assembly hole of the positioning seat after being inserted through the assembly through hole; a concave portion is formed on the outer cover at a position corresponding to the pressing control member for allowing the pressing control member to be pressed.

3. The ventilation and lens replacement assembly for snow goggles as claimed in claim 2, wherein an assembly groove is mounted on a rear end of the outer cover for mounting and connecting a strap.

4. The ventilation and lens replacement assembly for snow goggles as claimed in claim 1, wherein each of the two sides of the lens mounting hole corresponding to the assembly portion is provided with a connecting recess and the insertion portion is inserted through the connecting recess into the space between the positioning seat and the connection base.

5. The ventilation and lens replacement assembly for snow goggles as claimed in claim 1, wherein at least one fastening hole is mounted to an inner side of the positioning seat and at least one mounting hole is formed on an inner surface of the positioning seat; at least one mounting pin is projecting from the connection base and able to be mounted and connected with the mounting hole; the connection base is connected with the positioning seat by a fastener threaded and connected with the fastening hole.

6. The ventilation and lens replacement assembly for snow goggles as claimed in claim 1, wherein at least two first fitting protrusions are arranged at an inner surface of the recessed portion for being mounted and connected with one end of the elastic members while the moveable pushing block is provided with at least two second fitting protrusions which are mounted and connected with the other end of the elastic members.

7. The ventilation and lens replacement assembly for snow goggles as claimed in claim 1, wherein a locking protrusion is disposed on the pressing control member and located between the first abutting portion and the second abutting portion; the locking protrusion is inserted through the insertion hole to be locked and connected with an inner side of the penetrating hole.

8. The ventilation and lens replacement assembly for snow goggles as claimed in claim 1, wherein a gap is formed between the lens and the lens mounting hole for ventilation when the positioning part of the lens is moved to the first positioning portion to be fixed and connected with the first positioning portion.

* * * * *